April 13, 1965  E. L. BISHOP ETAL  3,178,331
TIRE BUILDING DRUM
Filed June 5, 1962  5 Sheets-Sheet 3

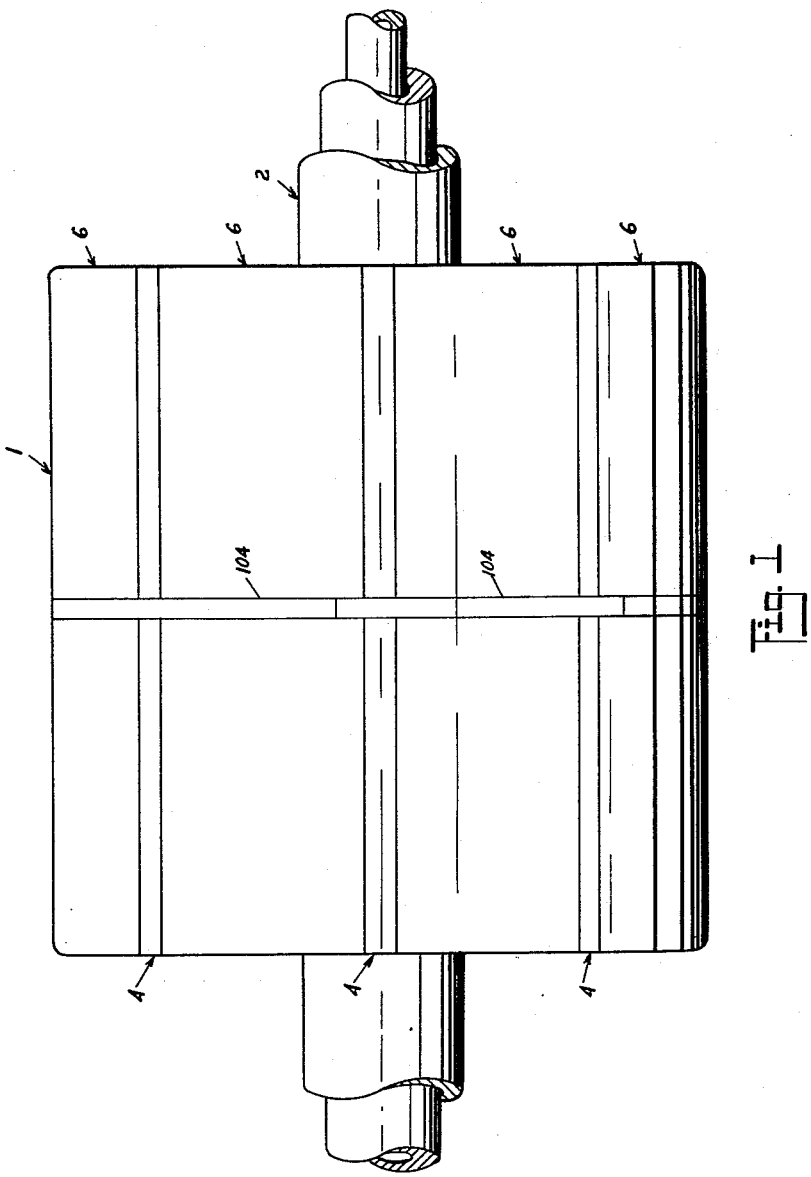

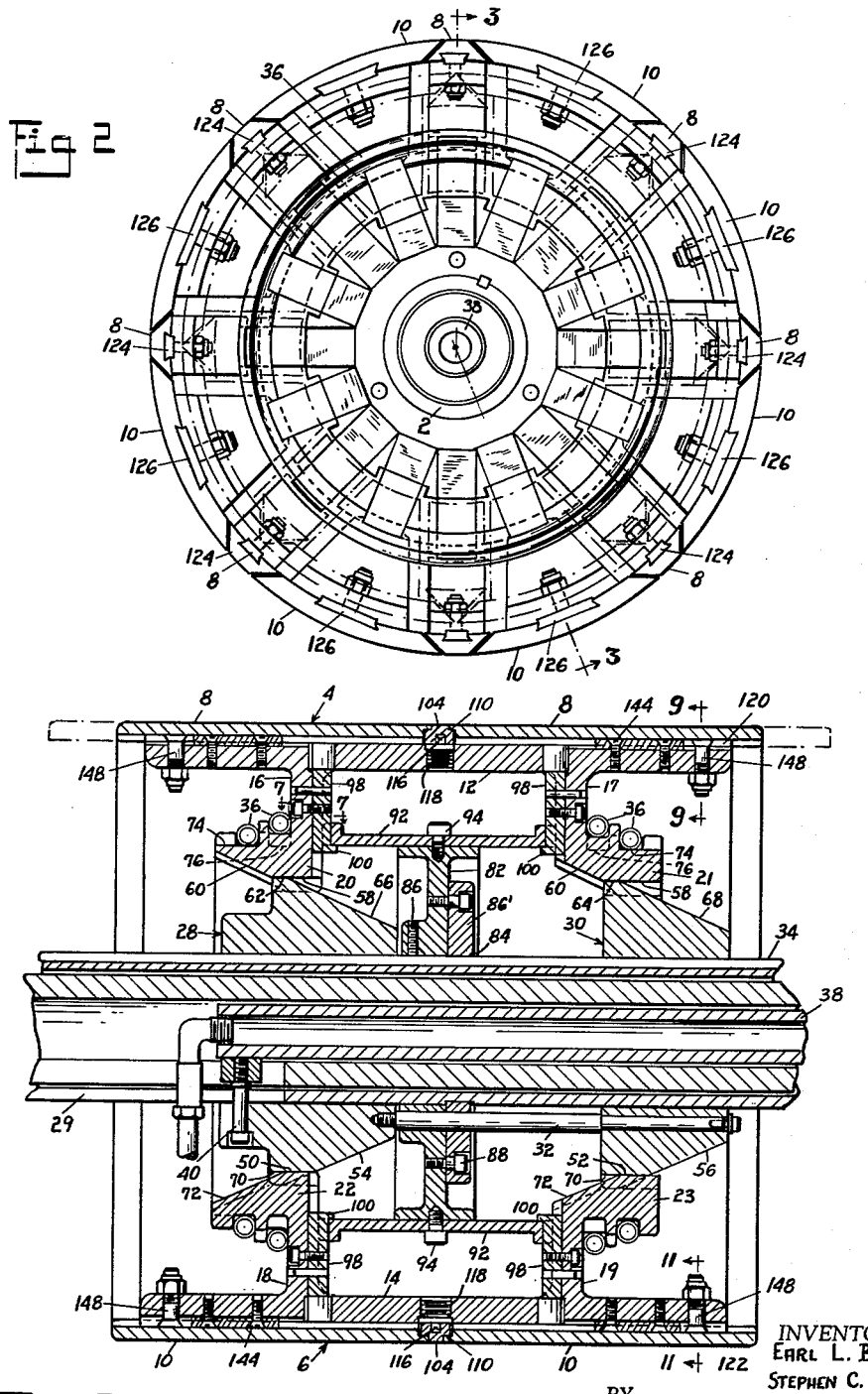

INVENTORS
EARL L. BISHOP AND
STEPHEN C. SABO
BY
Teare, Teter + Teare

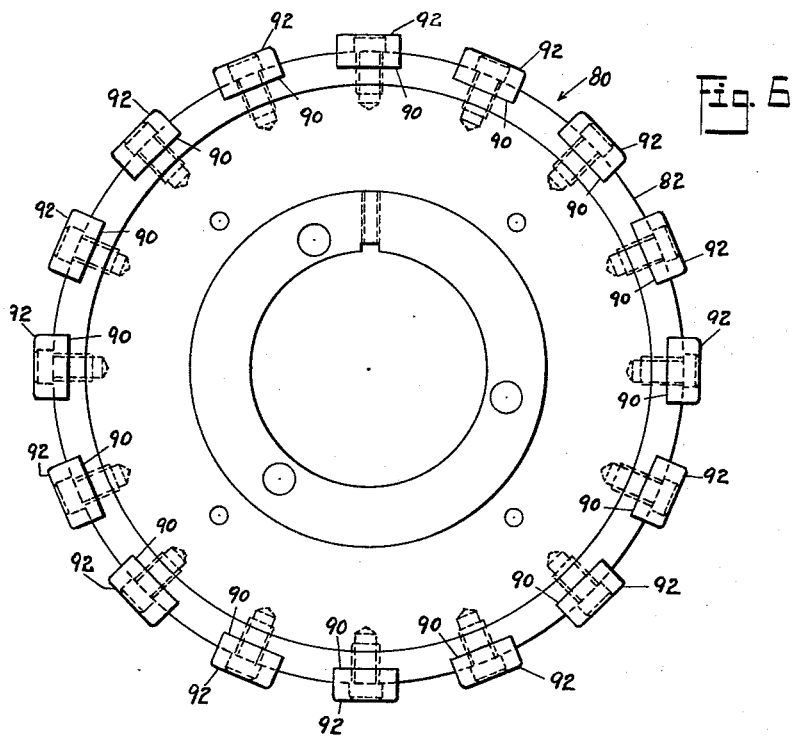
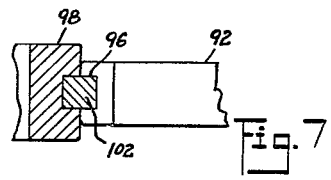
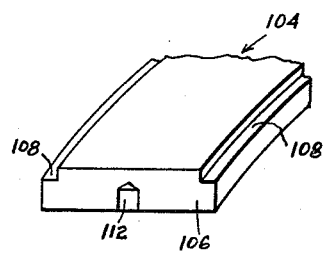
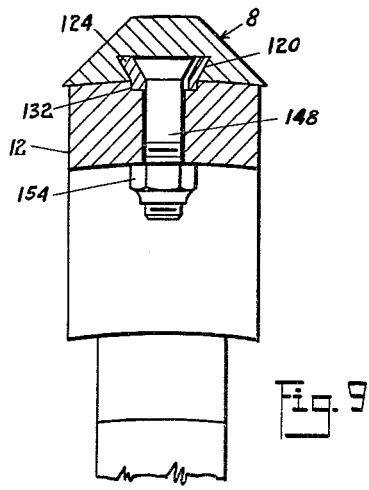

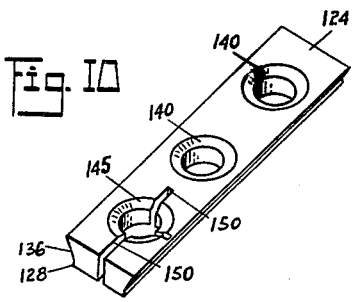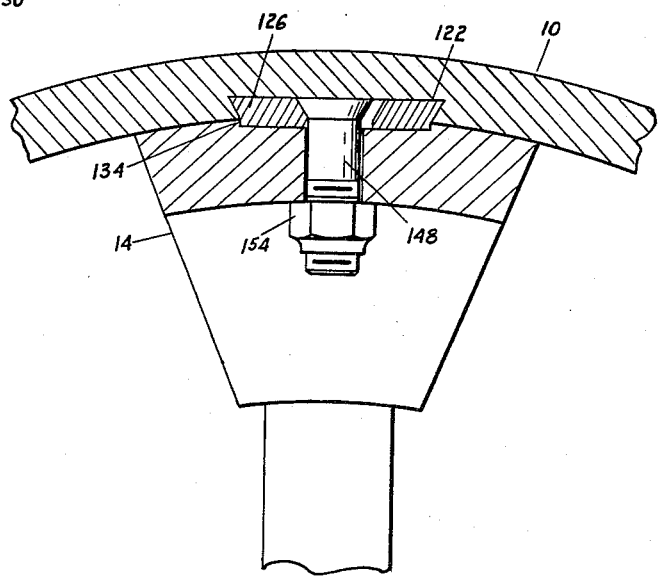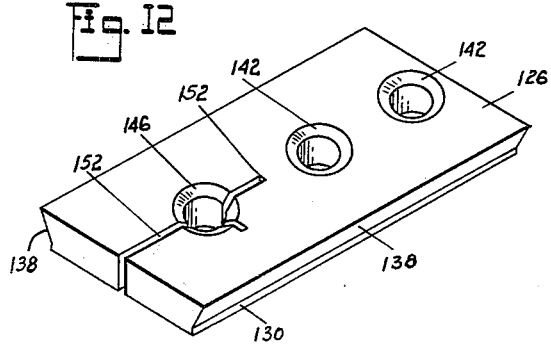

3,178,331
TIRE BUILDING DRUM
Earl L. Bishop, Cuyahoga Falls, and Stephen C. Sabo, Barberton, Ohio, assignors to The Akron Standard Mold Company, Akron, Ohio, a corporation of Ohio
Filed June 5, 1962, Ser. No. 200,139
8 Claims. (Cl. 156—415)

This invention relates to tire building drums, and more particularly relates to an improved tire building drum which may be radially collapsed and expanded without damage or distortion to the tire band or the like formed on the drum and which permits widthwise adjustment of the tire building drum without interrupting the smooth continuity of the tire building surface.

Heretofore, tire building drums have been provided of a type which comprised a plurality of segments arranged for collapsible movement to reduce the drum diameter thus enabling removal of the tire band from the drum. Various of the drum segments have been arranged for swinging movement in axial and/or radial directions for reducing the drum diameter. In such cases, the drum segments have been actuated by bulky and complex hinge or linkage mechanisms that are not only uneconomical with respect to initial construction and subsequent maintenance costs, but are also unsatisfactory because of the limited space available for such collapsing and expanding mechanisms within the tire building drum. Additionally, the collapsing and expanding movements of such mechanisms cannot be controlled with a high degree of precision, thereby causing spaces or gaps between the respective segments with consequent distortion and damage to the tire band formed on the drum.

Further difficulty has arisen in the provision of a tire building drum that may be axially adjusted to vary the width of the drum to accommodate building of a wide range of tire bands. In such cases, the widthwise adjustment of the tire building surface must be accomplished by a device which is accurately aligned relative to the drum segments and which coacts therewith in a manner to maintain a high degree of precision during the tire building operation. Additionally, such a device must coact with the drum segments in a manner which is susceptible to rapid and expeditious interchangeability without interrupting the continuity of the tire building surface.

Accordingly, it is a principal object of the present invention to provide a tire building drum which may be radially collapsed and expanded without damage or distortion to the tire band during the tire building operation.

A further object of the present invention is to provide a tire building drum which can be quickly and precisely collapsed and expanded while being of a relatively simple and rugged construction.

A further object of the present invention is to provide an arrangement for axially adjusting the width of the tire building drum without interrupting the smooth continuity of the tire building surface.

A still further object of the present invention is to provide an improved arrangement for axially adjusting the width of the tire building drum which is of a simple and rugged construction and which may quickly be assembled and disassembled without interrupting the smooth continuity of the tire building surface.

Further objects and advantages, and other new and useful features in the construction, arrangement and general combination of the elements for providing a radial collapsing and expanding tire building drum will be apparent to those skilled in the art, as the following description proceeds, with reference to the accompanying drawings, for purposes of illustration, but not of limitation, in which like reference characters designate like parts throughout, wherein:

FIG. 1 is a side elevational view, of the tire building drum embodying the present invention, shown in an expanded condition and mounted on a rotary support;

FIG. 2 is an end view of the tire building drum of FIG. 1, showing the drum segments in the expanded condition by solid lines and in the collapsed condition by broken lines;

FIG. 3 is a cross sectional view taken along lines 3—3 of FIG. 2;

FIG. 6 is an end view showing the hub and segment guide arrangements removed from the drum assembly;

FIG. 7 is a cross sectional view taken along line 7—7 of FIG. 3 showing a guide block arrangement for maintaining precision collapsing and expanding of the drum segments;

FIG. 8 is a perspective view showing one of the spacer members embodying the present invention removed from the drum assembly;

FIG. 9 is a vertical cross sectional view taken along line 9—9 of FIG. 3, showing one of the smaller key segments mounted on one of the segment supporting members;

FIG. 10 is a perspective view showing one of the smaller dovetail key members removed from the drum assembly for securing the smaller key segments to the segment supporting members;

FIG. 11 is a vertical cross sectional view taken along line 11—11 of FIG. 3, showing one of the larger dovetail key segments mounted on one of the segment supporting members;

FIG. 12 is a perspective view showing one of the larger dovetail key members removed from the drum assembly for securing the larger key segments to the segment supporting members.

Figure 4:
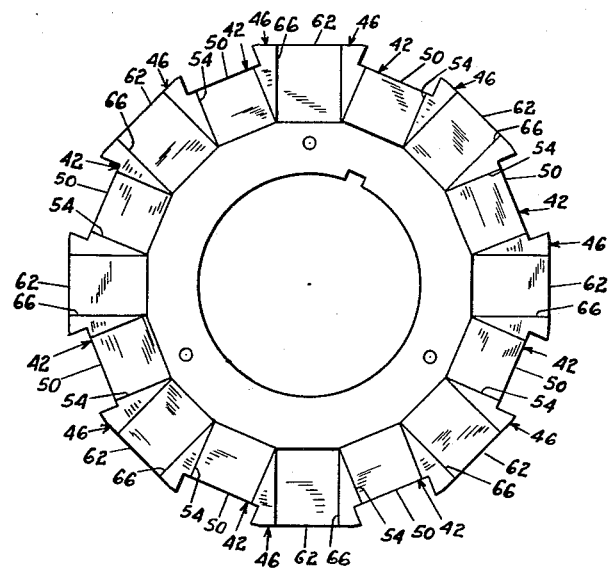
FIG. 4 is an end view showing one of the collapsing cam members removed from the drum assembly.

Generally, referring to FIGS. 1 to 3 of the drawings, a tire building drum 1 is shown mounted on a rotatable power-quill 2. In this form, the drum 1 may be composed of two sets of alternately disposed segment assemblies, namely, a set of smaller segment assemblies 4 and a set of intermediate or larger segment assemblies 6 which coact together to form a smooth and uninterrupted tire building surface. The segment assemblies 4 and 6, respectively, may be comprised of arcuate wing members 8 and 10 which are mounted for axial movement on base or segment supporting members 12 and 14. The segment supporting members may be provided with radially inwardly extending arms 16–19 having cam followers 20–23 adjacent the ends thereof and adapted for sliding coaction on corresponding cam surfaces as formed on a pair of cam members 28 and 30. As shown, the collapsible cam members may be arranged and attached together as a unit in tandem alignment by means of a connecting rod 32 and keyed, as at 34, for axial movement, as a unit, on the power-quill 2. Caming coaction between the segment assemblies and the cam members may be maintained during the radial collapsing and expanding movements of the drum by means of endless extensible clamping elements 36, which coact therewith in a manner to continuously bias the respective cam surfaces of the segment assemblies radially inwardly against the respective cam members.

Radial collapsing and expanding movement may be imparted to the segment assemblies 4 and 6 by means of a tubular drive shaft 38 reciprocably mounted within the power-quill 2 and adapted to be actuated by a suitable fluid motor (not shown). The drive shaft in turn may be connected to the cam member 28 by a suitable means, such as a bolt 40 which extends through a longitudinal slot 29 provided on the power-quill, whereby reciprocation of the drive shaft 38 may be translated into axial movement of the cam members 28 and 30 relative to the power-quill, to cause radial collapsing and expanding of the segment assemblies relative to the power-quill.

Figure 5:
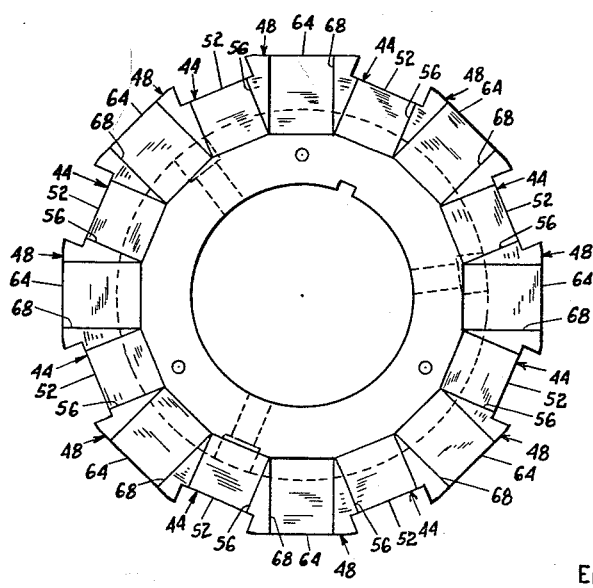
FIG. 5 is an end view showing another of the collapsing cam members removed from the drum assembly.

More specifically, and with reference to FIGS. 2, 4 and 5 of the drawings, the cam members 28 and 30, respectively, may be of a generally cone-shaped configuration having eight alternately disposed cam slots 42 and 44 disposed intermediate upstanding cam surfaces 46 and 48. The number of cam slots and cam surfaces will vary in each case dependent upon the number of coacting segment assemblies required to complete the tire building surface. As shown in FIGS. 4 and 5, the cam slots 42 and 44, respectively, may be formed having generally axially extending base portions 50 and 52 which open onto generally flat inclined portions 54 and 56 that extend generally downwardly toward the axis of the tire building drum and which are adapted for camming coaction with corresponding axial 58 and inclined 60 mating portions formed on the cam followers 20 and 21 of the smaller segment assemblies 4. Similarly, the cam surfaces 46 and 48, respectively, that extend intermediate the cam slots may be formed having generally axially extending portions 62 and 64 and generally flat inclined portions 66 and 68 which extend downwardly toward the axis of the drum and which are adapted for relative camming coaction with corresponding axial 70 and inclined 72 mating portions formed on the cam followers 22 and 23 of the larger segment assemblies 6. Thus, the relative difference in length between the axial portions of the cam slots 42, 44 and cam surfaces 46, 48 causes the smaller segment assemblies 4 to move radially inwardly before inward movement of the larger segment assemblies 6, which are thereafter drawn together and over the smaller segment assemblies into the collapsed condition, shown by the broken lines in FIG. 2. Such initial movement of the segment assemblies 4 breaks the adhesion between the tacky tire band and the drum, thereby obviating the need for a heavy and complicated collapsing equipment, while at the same time providing a smooth continuous tire building surface that is free of spaces or gaps that would interfere with the tire building operation. Moreover, the drum may be collapsed with greater precision with a minimum of effort and without damage or distortion to the tire band.

To maintain the camming coaction between the assemblies 4 and 6 and the cam members 28 and 30, the cam followers 20–23, respectively, may be provided on their upper surfaces with retaining slots 74 and 76 adapted to receive endless extensible clamping elements 36, best shown at FIGS. 2 and 3. Preferably, the clamping elements are of a resilient material, such as coil springs or the like, which when applied around the respective cam followers coact therewith in a manner to continuously bias the respective camming surfaces radially inwardly against the cam members 28 and 30 during the collapsing and expanding movements of the drum.

To further guide and maintain a precision camming coaction between the segment assemblies 4 and 6 and the collapsible cam members 28 and 30, there may be associated with the segment assemblies a centrally located guide arrangement, shown generally at 80 of FIG. 6. The guide arrangement may include a generally annular hub 82 keyed, as at 84, to the power-quill 2 and locked against rotation thereon by means of a set screw 86. A generally annular collar 86' may be secured to the hub, by suitable bolts 88, to provide an abutting surface for limiting axial movement of the cam member 30 to the left, as viewed in FIG. 3, and to thereby control, within the predetermined limits, the extent of expansion of the tire building drum.

As shown at FIGS. 6 and 7, the hub 82 may be formed having slots 90 for receiving a plurality of guide arms or brackets 92 secured thereon by suitable bolts 94. The number of guide brackets again, corresponding to the number of segment assemblies required to complete the tire building surface. The guide brackets may be of a generally U-shaped configuration, in vertical cross-section, having guide slots 96 formed adjacent the ends thereof and adapted for sliding engagement on guide blocks 98 which in turn are secured to the arm portions 16–19 of the segment supporting members 12 and 14. The guide blocks may be formed of a suitable bearing material, such as bronze or the like, having outwardly extending flange portions 100 for limiting upward movement of the respective segment assemblies and controlling the extent of expansion of the tire building drum. The guide blocks may further be provided with key portions 102 adapted to coact within the corresponding guide slots 96 formed in the guide brackets 92 to provide a precision radial collapsing and expanding of the segment assemblies during the tire building operation.

To maintain a smooth continuous tire building surface and to vary the width of the surface, the wing members 8 and 10 are shown separated axially from one another by means of arcuate interchangeable spacer members 104. As shown in FIG. 8, the spacer members may be of a generally inverted T-shaped configuration, in vertical cross-section, having a raised body portion 106 and outwardly extending shoulder portions 108 which are adapted for underlying and interlocking engagement with corresponding flange portions 110 provided in the respective wing members 8 and 10, as best shown at FIG. 3. The arcuate spacer members may further be provided with key slots 112 which are adapted for interlocking engagement with upstanding centering plugs 116. As shown, the centering plugs may be threaded, as at 118, into the segment supporting members 12 and 14 whereby axial alignment may be maintained between the respective wing and spacer members during the tire building operation.

The arcuate wing members 8 and 10, as shown in FIGS. 3, and 9–12, may be provided with undercut dovetail key slots 120 and 122 which are adapted for registration with corresponding sets of smaller and larger dovetail key members 124 and 126 secured to the respective base or segment supporting members 12 and 14. As shown in perspective, the dovetail key members 124 and 126 are formed with vertical side portions 128 and 130 adapted to be secured in corresponding recessed portions 132 and 134 provided in the upper surface of the respective segment supporting members 12 and 14 and with upwardly and outwardly tapered side portions 136 and 138 which are adapted for registration within the dovetail key slots 120 and 122 of the wing members. The dovetail key members 124 and 126, respectively, may be provided with apertures 140 and 142 to receive suitable means 144, such as flat headed screws or the like, for securing the key members to the segment supporting members.

To lock the wing members 8 and 10 at predetermined axial positions relative to the segment supporting members 12 and 14, the respective dovetail key members 124 and 126, respectively, may be provided with expandable apertures 145 and 146 adapted to receive attaching means, such as a plow bolt 148 or the like. The apertures may be formed with radial slotted portions 150 and 152 extending longitudinally from adjacent one end of the key members, whereby tightening of the threaded nuts 154 relative to the corresponding plow bolts 148, causes the key members to expand transversely within the dovetail key slots 120 and 122 to lock the wing members 8 and 10 against further axial movement relative to the segment supporting members.

In operation, when it becomes necessary to vary the width of the tire building surface, it is simply a matter of applying a few turns to the threaded nut 154 to relieve the expansion force of the plow bolts 148, whereby the wing members 8 and 10 may be adjusted to various widths, such as shown by the broken lines 154 at FIG. 3. Spacer members 104 may then be replaced by those of a predetermined size, whereby the wing members 8 and 10 may again be repositioned in overlapping relationship with respect to the new spacer members and secured thereon by expansion of the respective key members 124 and 126. Because of the overlapping relation to the wing members relative to the spacer members, the adjustment in width of the tire building surface may be accomplished without interrupting the smooth continuity of the tire building surface. Moreover, the spacer members are accurately centered on the segment supporting members to insure a precise axial adjustment of the wing members during the tire building operation.

In a typical application of the tire building drum embodying the present invention, the drive shaft 38 may be reciprocated to the right, as viewed in FIG. 3 so as to impart an axial movement to the collapsible cam members 28 and 30. Such axial movement of the cam members results in a camming coaction relative to the cam followers 20–23 of the respective segment assemblies 4 and 6 causing the drum to expand to the solid line condition, illustrated in FIG. 2. In the expanded condition, various tire plies may be wrapped around the drum and at proper periods during the operational cycle, the bead setting and stitching operations may be performed upon the tire plies. Upon completion of the tire building operation, the drive shaft 38 may be reciprocated to the left causing the segment assemblies to collapse to the broken line condition, as shown in FIG. 2. Such collapsing of the segment assemblies in the manner prescribed provides sufficient clearance for removal of the tire band, whereupon the tire building drum is in a condition for another cycle of operation.

Accordingly, it can be seen that the tire building drum embodying the present invention provides a relatively simple and yet highly precision, compact arrangement for radially collapsing and expanding the drum and yet offers no spaces or gaps to interfere with the tire building operation. Moreover, with this arrangement the axial width of the drum may be adjusted to accommodate a wide range of tire bands without interrupting the continuity of the tire building surface. The interlocking relation between the wing members and respective spacer members provides an arrangement which may be rapidly assembled and disassembled with a minimum of effort while maintaining a smooth continuous tire building surface.

We have shown and described what we consider to be the preferred embodiment of our invention, together with suggested forms, and it will be obvious to those skilled in the art that other changes may be made without departing from the scope of our invention as defined by the appended claims.

We claim:

1. A collapsible tire building drum comprising, a plurality of segment assemblies arranged to form a continuous tire building surface, a shaft spaced within said segment assemblies adapted for rotating said drum, cam means attached to and adapted for axial movement relative to said shaft, cam follower means disposed between said cam means and said segment assemblies for collapsing and expanding the latter upon axial movement of said cam means relative to said shaft, said cam means including a plurality of recessed cam slots and a plurality of upstanding cam surfaces alternately disposed intermediate said recessed cam slots for moving certain of said segment assemblies radially in advance of other of said segment assemblies upon collapsing of the drum, and for moving said other of said segment assemblies radially in advance of said first mentioned segment assemblies upon expanding of the drum.

2. A collapsible tire building drum according to claim 1, including a guide assembly mounted on said shaft to maintain precision radial movement of said segment assemblies upon collapsing and expanding movement of said drum, said guide assembly comprising, a hub attached to said shaft, guideway means on the cam follower means, a plurality of axially extending guide arms mounted in spaced relation on said hub for sliding coaction with said guideway means.

3. A collapsible tire building drum according to claim 1, including an endless extensible clamping means engaging said cam follower means for continuously biasing the latter radially inwardly relative to said cam means, said cam follower means having slotted portions thereon and said clamping means including at least one coiled spring received in said slotted portions.

4. A collapsible tire building drum comprising, a plurality of segment assemblies arranged to form a continuous tire building surface, a shaft spaced within said segment assemblies and adapted for rotating the drum, a pair of cam members attached to and adapted for axial movement relative to said shaft, a pair of oppositely disposed cam follower members depending from each of said segment assemblies and having cam follower surface portions adjacent one end thereof for collapsing and expanding said segment assemblies upon axial movement of said cam members relative to said shaft, an endless extensible clamping means engageably coacting with an associated one of each of the pairs of cam follower members for continuously biasing the latter radially inwardly in camming relation against the respective of said cam members, each of said cam members including a plurality of recessed cam slots and a plurality of generally upstanding cam surfaces alternately disposed intermediate said recessed cam slots for moving certain of said segment assemblies radially in advance of other of said segment assemblies upon collapsing of the drum, and for moving said other of said segment assemblies radially in advance of said first mentioned segment assemblies upon expanding of the drum, and a guide assembly mounted on said shaft between said cam members and adapted for coacting engagement with said cam follower members to maintain precision radial movement of said segment assemblies during said collapsing and expanding movements of said drum.

5. A collapsible tire building drum according to claim 4, wherein said guide assembly includes a hub attached to said shaft, a plurality of circumferentially spaced guide arms mounted on said hub, each of said guide arms being centered on and extending axially in opposite directions from said hub, and the ends of each of said arms being disposed within radially extending guideway tracks provided interiorly on each one of the opposed pairs of said cam follower members.

6. A collapsible tire building drum comprising, a plurality of segment assemblies arranged to form a continuous tire building surface, a hollow shaft spaced within said segment assemblies and adapted for rotating said drum, an elongated drive member disposed for reciprocation within said shaft, a pair of cone-like cam members attached exteriorly to and adapted for axial movement relative to said shaft upon reciprocation of said drive member, a pair of oppositely disposed cam follower members depending from each of said segment assemblies and having cam follower surface portions adjacent one end thereof for collapsing and expanding the segment assemblies upon axial movement of said cam members, each of said cam members including a plurality of recessed cam slots defined by angularly and axially extending portions, and a plurality of generally upstanding cam surfaces disposed alternately intermediate said recessed cam slots and also being defined by angularly and axially extending portions, the axially extending portions of the upstanding cam surfaces being of a different dimensional length compared to that of the corresponding axially extending portions on the recessed cam slots for moving certain of said segment assemblies radially in advance of other of said segment assemblies upon collapsing of the drum, and for moving said other of said segment assemblies radially in advance of said first mentioned segment assemblies upon expanding of the drum.

7. A collapsible tire building drum, comprising a hollow, rotatable shaft, a first set of segment assemblies and a second set of segment assemblies spaced from said shaft, an elongated drive member disposed for reciprocal movement within said shaft, a pair of generally frusto-conical shaped cam members attached exteriorly to and adapted for axial movement relative to said shaft upon reciprocation of said drive member, a pair of oppositely disposed generally L-shaped cam follower members depending from each of said segment assemblies and having cam follower surface portions adjacent one end thereof for collapsing and expanding the segment assemblies upon axial movement of said cam members, an endless extensible coiled spring engageably coacting with an associated one of each pair of said cam follower members for continuously biasing the latter as a unit radially inwardly in camming engagement against the respective of said cam members, each of said cam members including a plurality of recessed cam slots defined by angularly and axially extending portions, and a plurality of generally upstanding cam surfaces disposed alternately intermediate said recessed cam slots and also defined by angularly and axially extending portions, the axially extending portions of the upstanding cam surfaces being of a greater dimensional length compared to that of the corresponding axially extending portions on the recessed cam slots for moving said first set of segment assemblies radially in advance of said second set of segment assemblies upon collapsing of the drum, and for moving said second set of segment assemblies radially in advance of said first set of segment assemblies upon expanding of the drum.

8. A collapsible tire building drum comprising, in combination, a plurality of arcuate segment supporting members arranged to form an annular tire building surface for rotation about a central axis, a pair of arcuate key-segments having undercut slotted portions mounted for axial width-wise adjustment on each of said supporting members, an elongated key member having tapered side portions disposed for coacting engagement within the undercut slotted portions of each of said key-segments, each of said key-members having an aperture extending therethrough and including a beveled side wall portion for receiving a fastening means therethrough, each of said key-members having at least one slot extending longitudinally from said aperture and opening onto an end of each of said key-members to provide transverse expansion of said key-members upon actuation of said fastening means, said fastening means including an elongated, headed bolt member projecting from each of said supporting members and disposed through the aperture in each of said key-members, and threaded means coacting against the underside of each of said supporting members and with the corresponding bolt shank to draw the bolt head against the beveled portion of the aperture toward said supporting member to transversely expand the respective key-member into locking engagement against said key-segments in the axially adjusted position of said key-segments.

References Cited by the Examiner
UNITED STATES PATENTS

| 2,367,831 | 1/45 | Manson | 156—415 |
| 2,565,071 | 8/51 | Frazier | 156—350 |
| 2,614,057 | 10/52 | Ericson et al. | 156—415 XR |
| 2,655,977 | 10/53 | Hodgkins | 156—514 X |
| 2,926,721 | 3/60 | Haase | 156—415 |
| 2,980,160 | 4/61 | Deibel | 156—415 |
| 2,996,108 | 8/61 | Beebee | 156—417 |

EARL M. BERGERT, *Primary Examiner.*
JOSEPH REBOLD, *Examiner.*

Notice of Adverse Decision in Interference

In Interference No. 96,276 involving Patent No. 3,178,331, E. L. Bishop and S. C. Sabo, TIRE BUILDING DRUM, final judgment adverse to the patentees was rendered Sept. 13, 1968, as to claims 1, 3 and 4.

[*Official Gazette October 29, 1968.*]